(12) United States Patent
Cahalan et al.

(10) Patent No.: US 8,228,997 B1
(45) Date of Patent: Jul. 24, 2012

(54) SYSTEMS AND METHODS FOR AN EFFICIENT SCAN PATTERN SEARCH IN A VIDEO ENCODER MOTION ESTIMATION ENGINE

(75) Inventors: Timothy R. Cahalan, Austin, TX (US); Christopher T. Foulds, Austin, TX (US); Moinul H. Khan, Austin, TX (US)

(73) Assignee: Marvell International Ltd. (BM)

( * ) Notice: Subject to any disclaimer, the term of this patent is extended or adjusted under 35 U.S.C. 154(b) by 904 days.

(21) Appl. No.: 12/325,569

(22) Filed: Dec. 1, 2008

Related U.S. Application Data

(60) Provisional application No. 61/007,133, filed on Dec. 11, 2007.

(51) Int. Cl.
*H04N 7/12* (2006.01)
(52) U.S. Cl. .................................... 375/240.24
(58) Field of Classification Search ........... 375/240; 348/714–718
See application file for complete search history.

(56) References Cited

U.S. PATENT DOCUMENTS

| | | | |
|---|---|---|---|
| 6,674,798 B2 * | 1/2004 | Ishihara et al. | 375/240.16 |
| 7,126,991 B1 * | 10/2006 | Mimar | 375/240.16 |
| 2003/0016748 A1 * | 1/2003 | Hwang et al. | 375/240.12 |

OTHER PUBLICATIONS

Chen et al. ("Analysis and Architecture Design of Variable Block-Size Motion Estimation for H.264/AVC", IEEE Transactions on Circuits and Systems, Feb. 2006).*
Chien et al. ("Hardware Architecture Design of Video Compression for Multimedia Communication Systems," IEEE Communications Magazine, Aug. 2005).*
Huang et al. ("A 1.3TOPS H.264/AVC Single-Chip Encoder for HDTV Applications," IEEE International Solid-State Circuits Conference, 2005).*
Huang et al. ("Survey on Block Matching Motion Estimation Algorithms and Architectures with New Results," Journal of VLSI Signal Processing, 2006).*

* cited by examiner

*Primary Examiner* — Gilberto Barron, Jr.
*Assistant Examiner* — Virginia T Ho

(57) ABSTRACT

In accordance with the teachings described herein, systems and methods are provided for scanning a search area of reference pixel data to identify a reference macroblock of pixels with a closest pixel fit to a current macroblock of pixels. An example system may include a local memory array (e.g., a shift register), a processing block and a scan sequencer. The local memory array may include a plurality of rows and columns, with N extra rows or columns in addition to a number of rows or columns necessary to store N reference macroblocks of pixels The processing block may be used to compare reference macroblocks of pixels with the current macroblock of pixels to identify the reference macroblock of pixels with the closest pixel fit to the current macroblock of pixels. The scan sequencer may be used to load reference pixel data into the local memory array and present reference macroblocks of pixels from the local memory array to the processing block according to a scan pattern.

24 Claims, 17 Drawing Sheets

SYSTEMS AND METHODS FOR AN EFFICIENT SCAN PATTERN SEARCH IN A VIDEO ENCODER MOTION ESTIMATION ENGINE

CROSS-REFERENCE TO RELATED APPLICATIONS

This application claims priority from U.S. Provisional Patent Application No. 61/007,113, filed on Dec. 11, 2007, and entitled "Method and Apparatus for a Snake Scan Pattern Search in a Video Encoder Motion Estimation Engine," the entirety of which is incorporated herein by reference.

FIELD

The technology described in this patent document relates generally to video processing. More particularly, systems and methods are disclosed for an efficient scan pattern search in a video encoder motion estimation engine.

BACKGROUND

FIG. 1 is a block diagram of a typical video encoder 30 having a motion estimation engine 32. The motion estimation engine 32 encodes the incoming video signal 34 by using intra-coded frames (I-Frames) 36 to generate one or more predictive-coded frames (P-Frames) 38. An I-Frame 36 is typically generated by compressing a single frame of the incoming video signal 34. The P-Frame 38 then provides more compression for subsequent frames by making reference to the data in the previous frame instead of compressing an entire frame of data. For instance, a P-Frame 38 may only include data indicating how the pixel data has changed from the previous frame (Δ Pixels) and one or more motion vectors to identify the motion between frames.

In order to generate a P-Frame 38, the motion estimation engine 32 typically compares 16×16 macroblocks of pixel data from the current frame 40 with 16×16 macroblocks of data from a previously generated frame of data, referred to as the reference frame 42. The motion estimation engine 32 attempts to find the best fit pixel match between each macroblock in the current frame 40 and each macroblock in the reference frame 42. In this way, the P-Frame only needs to include the small pixel difference (Δ Pixels) between the matched macroblocks and a motion vector to identify where the macroblock was located in the reference frame 42. An example of this process is further illustrated in FIGS. 2A and 2B.

FIG. 2A depicts an example macroblock 50 within a current frame 52 of pixel data. Also shown in FIG. 2A is a predicted motion vector (PMV) 54 that provides an estimate of where the macroblock 50 was likely located in the reference frame. As illustrated, a motion vector 54 typically points from a corner pixel of the current macroblock 50 to a corner pixel of the reference macroblock 56. Methods for calculating a predicted motion vector (PMV) 54 are known in the art and are beyond the scope of the instant application.

Based on the predicted motion vector (PMV) 54, a search area 60 is selected within the reference frame 62, as illustrated in FIG. 2B. As shown, the search area 60 may include all of the macroblocks surrounding the reference macroblock 56 identified by the predicted motion vector (PMV) 54. The current macroblock 50 is then compared with reference macroblocks at every pixel location within the search area 60 in order to identify the motion vector location within the search area 60 with the closest pixel match. This comparison is typically performed by calculating a sum of absolute differences (SAD) for each motion vector location within the search area 60, and selecting the motion vector location with the lowest SAD as the best match. It should be understood that other factors, such as motion vector cost, may also be used in this selection process.

The calculations performed by a typical motion estimation engine to identify the best fit pixel match between a current macroblock and a search area in a reference frame is often one of the most clock cycle, resource and power consuming processes performed by a video encoder. For example, in the case of 16×16 macroblocks, 256 pixel differences need to be calculated to determine the SAD for every motion vector within the search area. The system resources required to perform these calculations may thus be substantially affected by the way in which this data is loaded into local memory and processed by the motion estimation engine.

FIGS. 3 and 4 illustrate two prior art methods for processing the pixel data from a search area to identify the best fit pixel match with a current macroblock. In these examples, each pixel in the search area (illustrated by white circles) represents a potential motion vector. For each potential motion vector, a SAD is calculated between the current macroblock and the reference macroblock starting at the pixel location identified by the potential motion vector. The arrows in FIGS. 3 and 4 illustrate example scan patterns showing how the reference macroblocks are accessed from memory and processed by a typical motion estimation engine.

With reference first to FIG. 3, this example shows the pedantic approach to processing macroblocks of pixel data in a search area 70. A typical search starts with the potential motion vector 72 in the top left corner of the search area, scans horizontally (or vertically) across each row, and then moves down one row and repeats the process. At each potential motion vector within the search area, the motion estimation engine will typically read a 16×16 macroblock of reference pixel data from a local cache, calculate the SAD, compare the SAD with a minimum to track the best fit pixel match, and then move on to the next potential motion vector. This approach is simple, but requires a macroblock of reference pixel data to be accessed from memory for every potential motion vector.

FIG. 4 illustrates another example search pattern that is somewhat more efficient than the pattern shown in FIG. 3. In this example, the motion estimation engine utilizes a shift register to store enough reference pixel data to process multiple motion vectors from a single stride of data once the shift register is full. This approach reduces the number of times that the memory needs to be accessed. In the illustrated example, the width of the shift register is sufficient to store enough data to process four macroblocks of reference pixel data. For instance, in the case of 16×16 macroblocks, a 19×16 shift register would provide sufficient storage to process four reference macroblocks before a new stride of data is needed from the reference data cache.

Using the scan pattern illustrated in FIG. 4, the reference pixel data needed to process the reference macroblocks for the first four motion vectors 80 in the top left corner of the search area 82 is initially loaded into the shift register for the motion estimation engine. The motion estimation engine then calculates the SAD for each of these four initial reference macroblocks, and compares each SAD with a minimum to track the best fit pixel match. A new stride of data is then loaded into the shift register to process the first four motion vectors in the next row of the search area 82. This process is repeated until the last row 84 in the search area 82 is processed, afterwhich the scan pattern returns to the top row of the search area 82 to process another column of four motion vectors. This scan pattern is repeated until SADs have been calculated for each potential motion vector in the search area 82.

With the scan pattern shown in FIG. 4, the reference data cache only needs to be accessed to add a single stride of data to the shift register when the scan pattern shifts from one row to the next and to completely refill the shift register when the scan pattern moves from the bottom to the top of the search area. It will be appreciated that this approach will significantly reduce the number of memory accesses compared to the scan pattern of FIG. 3. However, the scan pattern shown in FIG. 4 still requires a high percentage of the reference pixels to be read from memory multiple times. Consequently, it is desirable to provide an efficient scan pattern that would reduce the amount of memory accesses needed to processes all of the potential motion vectors in a search area.

SUMMARY

In accordance with the teachings described herein, systems and methods are provided for scanning a search area of reference pixel data to identify a reference macroblock of pixels with a closest pixel fit to a current macroblock of pixels. An example system may include a local memory array (e.g., a shift register), a processing block and a scan sequencer. The local memory array may include a plurality of rows and columns, with N extra rows or columns in addition to a number of rows or columns necessary to store N reference macroblocks of pixels The processing block may be used to compare reference macroblocks of pixels with the current macroblock of pixels to identify the reference macroblock of pixels with the closest pixel fit to the current macroblock of pixels. The scan sequencer may be used to load reference pixel data into the local memory array and present reference macroblocks of pixels from the local memory array to the processing block according to a scan pattern. The scan pattern may cause either N or 2N reference macroblocks of pixels to be presented to the processing block before new reference pixel data is loaded into the local memory array. The scan pattern may also cause reference pixel data in the local memory array to shift in either a first direction or both a first and a second direction when loading new reference pixel data such that no more than a single row or column of reference pixel data is loaded into the local memory array between any two comparisons by the processing block.

In one example, the system may be configured for 16×16 macroblocks, using a shift register with 16 rows and 23 columns. In certain embodiments, the processing block may compare reference macroblocks of pixels with the current macroblock of pixels by calculating a sum of absolute differences. For instance, a reference macroblock of pixels having the lowest sum of absolute differences out of all of the reference macroblocks of pixels in the search area may be selected as the reference macroblock of pixels with the closest pixel fit to the current macroblock of pixels. In one embodiment, the system may also include a shifter that is controlled by the scan sequencer to retrieve blocks of reference pixel data from a local memory cache, extract rows of reference pixel data from the blocks of reference pixel data, and load the shift register with the rows of reference pixel data.

A method of scanning a search area of reference pixel data to identify a reference macroblock of pixels with a closest pixel fit to a current macroblock of pixels may include the following steps: a) loading a local memory array with reference pixel data from the search area, the local memory array including N extra rows or columns in addition to a number of rows or columns necessary to store N reference macroblocks of pixels; b) using the reference pixel data loaded in the local memory array to compare N reference macroblocks of pixels with the current macroblock of pixels to track a reference macroblock of pixels that most closely matches the current macroblock of pixels; c) shifting the reference pixel data in the local memory array in a first direction and loading one new row or column of reference pixel data into the local memory array; d) if an end of a row or column in the search area has not been reached, then returning to step b; e) if an end of a row or column in the search area has been reached, then using the reference pixel data loaded in the local memory array to compare 2N reference macroblocks of pixels with the current macroblock of pixels to track the reference macroblock of pixels that most closely matches the current macroblock of pixels; and f) shifting the reference pixel data in the local memory array in both the first direction and a second direction, loading one new row or column of reference pixel data into the local memory array, and returning to step b.

Another method of scanning a search area of reference pixel data to identify a reference macroblock of pixels with a closest pixel fit to a current macroblock of pixels may include the following steps: loading a local memory array with reference pixel data from the search area to compare a first plurality of reference macroblocks of pixels with the current macroblock of pixels; shifting the reference pixel data in the local memory array in a first direction and loading one row or column of pixel data from the search area into the local memory array to compare a second plurality of reference macroblocks of pixels with the current macroblock of pixels; and shifting the reference pixel data in the local memory array in both the first direction and a second direction and loading one row or column of pixel data from the search area into the local memory array to compare a third plurality of reference macroblocks of pixels with the current macroblock of pixels.

A method for determining a motion vector location for encoding a video signal may include the following steps: storing a reference frame of the video signal in a memory device; receiving a current frame of the video signal to be encoded; selecting a macroblock of pixels from the current frame; identifying a search area in the stored reference frame for comparison with the macroblock of pixels from the current frame; for each pixel in the search area, comparing the macroblock of pixels from the current frame with a reference macroblock of pixels from the stored reference frame to determine a sum of absolute differences, the comparison being performed using a scan pattern for loading the reference macroblock of pixels for each pixel in the search area into a local memory array, the scan pattern causing sufficient pixel data to be loaded into the local memory array to determine the sums of absolute differences for multiple reference macroblocks of pixels without loading any additional pixel data, and the local memory array being sized to allow the scan pattern to shift pixel data within the local memory array in two directions such that the sums of absolute differences for each reference macroblock within the search area are determined without loading more than a single row or column of pixel data into the local memory array between any two sum of absolute differences calculations; and selecting a pixel in the search area that is associated with the lowest sum of absolute differences as a motion vector location associated with the macroblock of pixels from the current frame.

DETAILED DESCRIPTION

Figure 1:
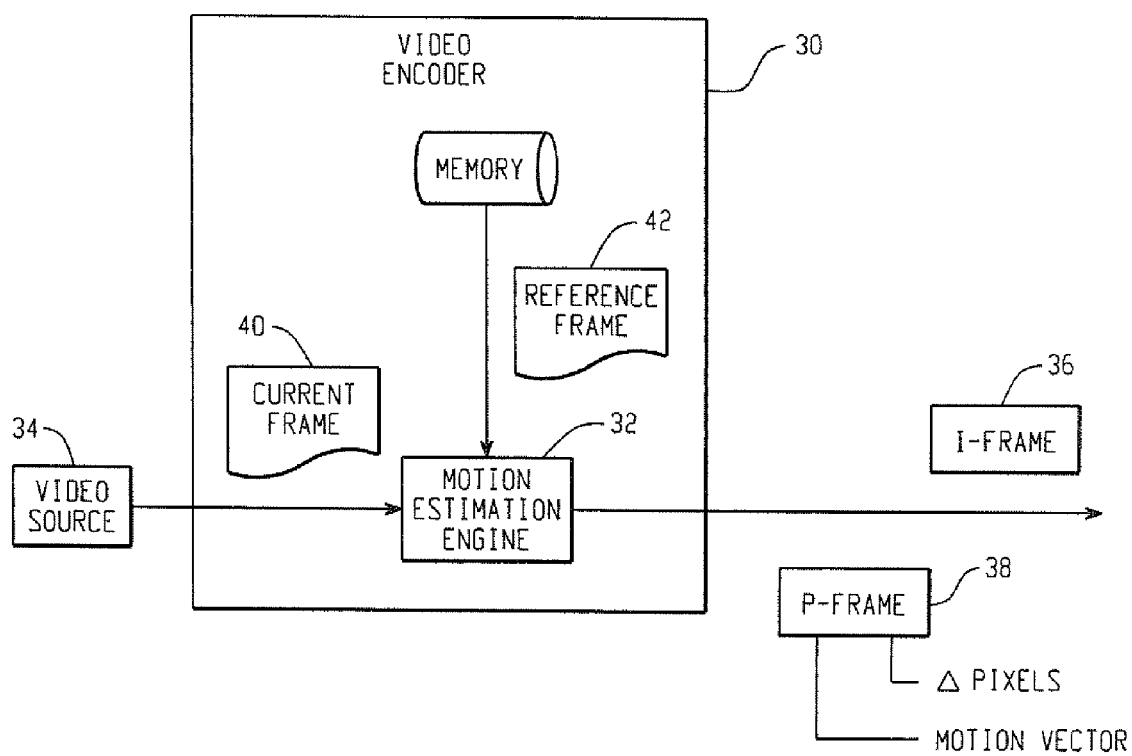
FIG. 1 is a block diagram of a typical video encoder having a motion estimation engine.
Figure 2A:
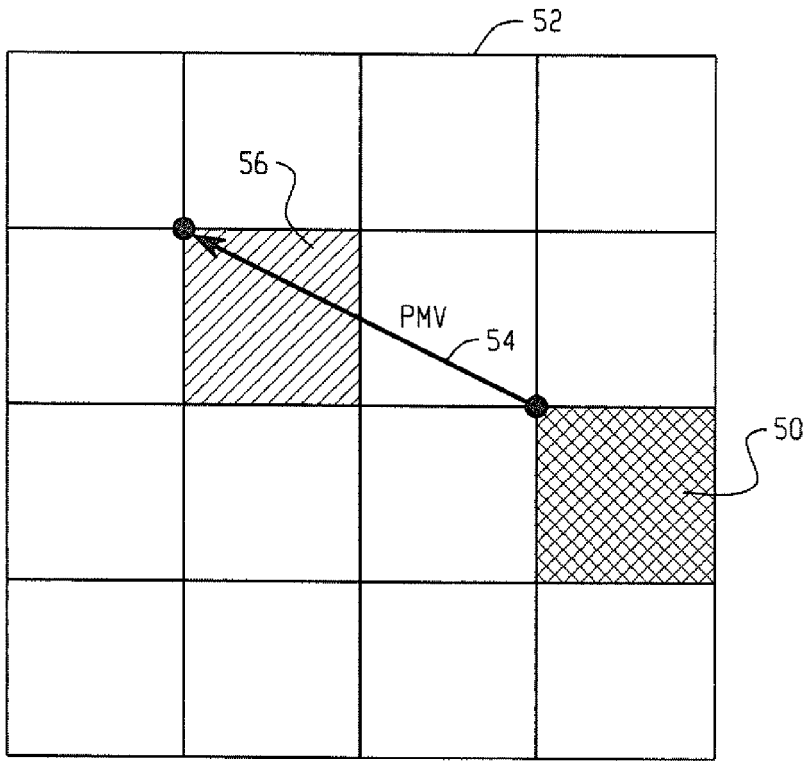
FIGS. 2A and 2B illustrate an example process for identifying a best fit pixel match between macroblocks in a current frame and macroblocks in a reference frame.
Figure 2B:
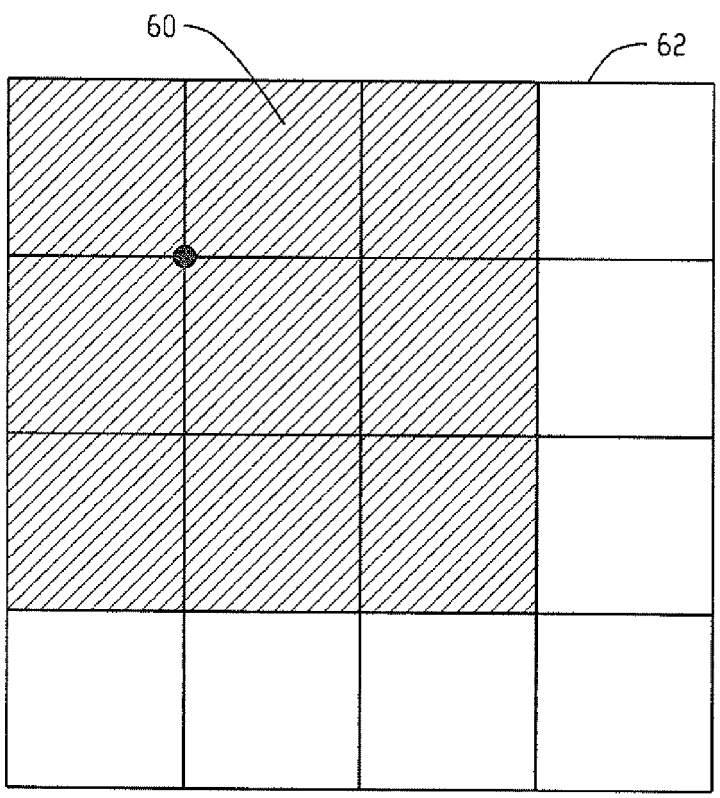
Figure 3:
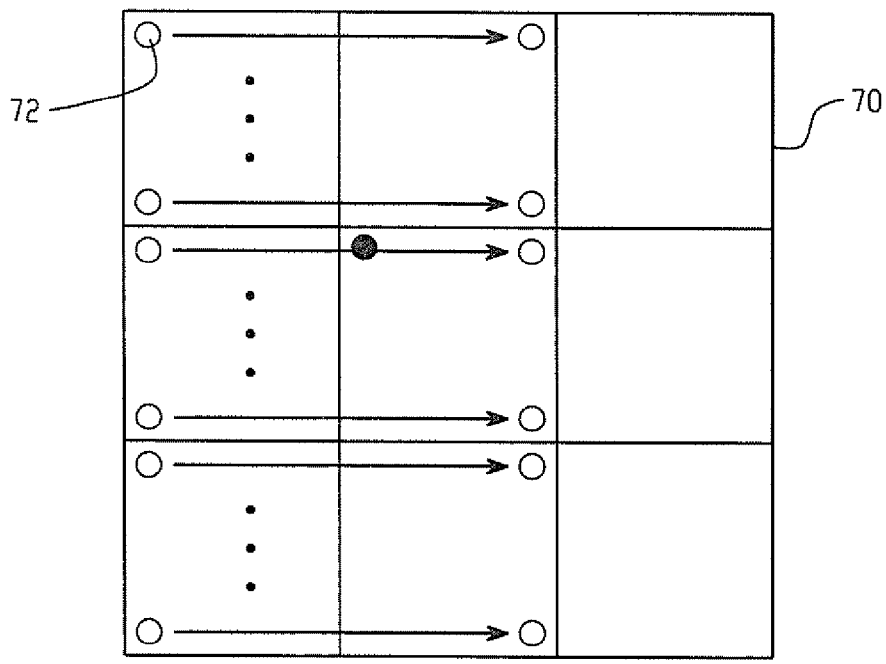
FIGS. 3 and 4 illustrate two prior art methods for processing the pixel data from a search area to identify the best fit pixel match with a current macroblock.
Figure 4:
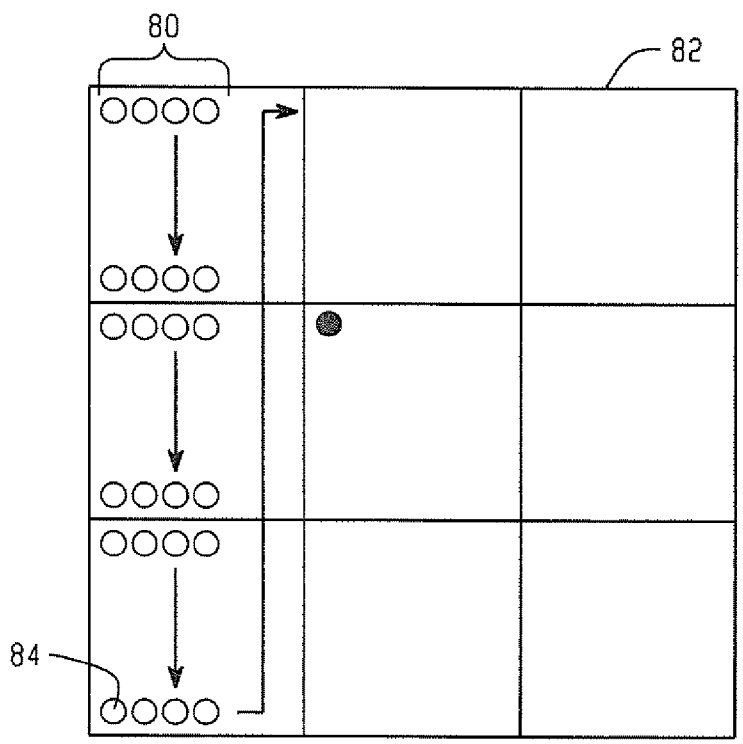
Figure 5:
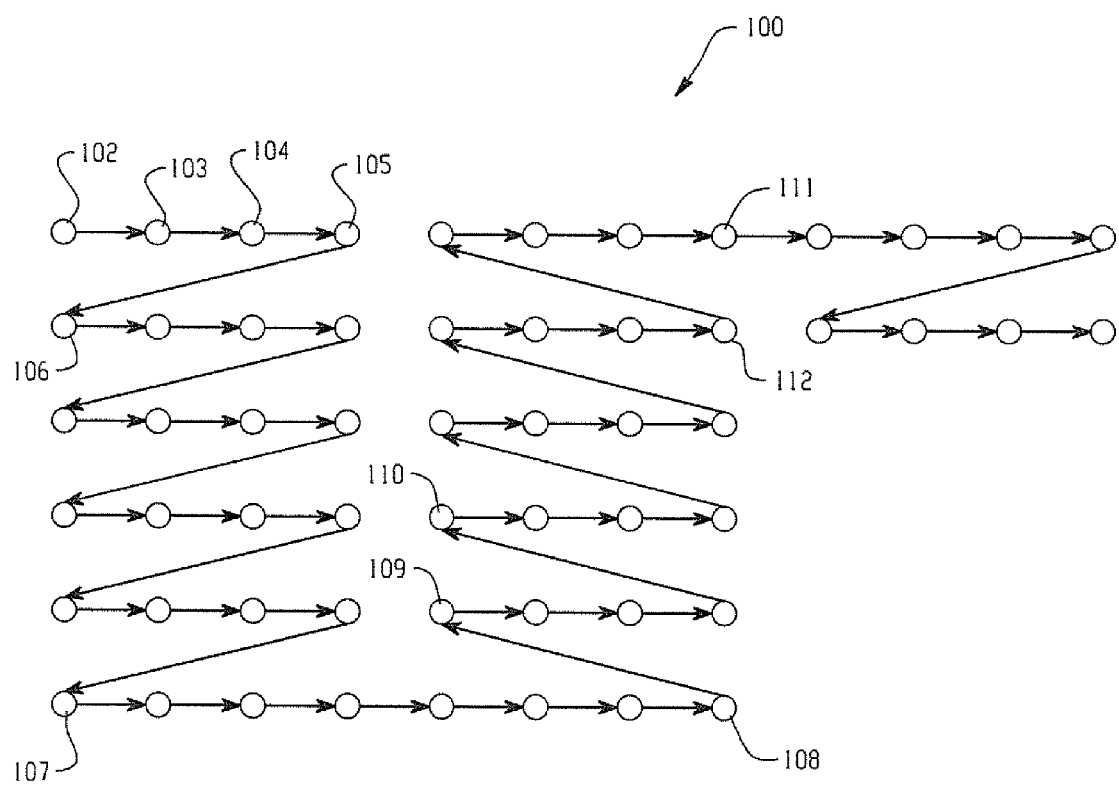
FIG. 5 is a diagram illustrating an exemplary efficient scan pattern for a video motion estimation engine.

FIG. 5 is a diagram illustrating an efficient scan pattern 100 for a video motion estimation engine. The process illustrated in FIG. 5 utilizes a wider local memory array (e.g., a shift register) to implement a scan pattern that shifts in both a vertical and a horizontal direction. In this manner, an exhaustive SAD comparison between a current macroblock of pixel data and the macroblocks in a reference search area may be performed using less system resources than conventional methods. In addition, the size of the reference search area may be varied without affecting the scan pattern.

The circles shown in FIG. 5 represent the potential motion vectors in a reference search area. As described above, a video motion estimation engine may perform a full search motion estimation by comparing a current macroblock of data with the reference macroblock of data identified by each of the potential motion vectors in the search area to identify the reference macroblock that most closely matches the current macroblock. Typically, this comparison is performed by calculating the SAD between the current macroblock and each reference macroblock in the search area and identifying the reference macroblock with the lowest SAD. A reference macroblock is typically identified by a motion vector pointing to the pixel in its top left corner. With reference to FIG. 5, each circle in the diagram represents a single comparison between the current macroblock and a reference macroblock identified by a motion vector pointing to that pixel location in the search area.

The example scan pattern 100 shown in FIG. 5 utilizes a memory array (e.g., a shift register) that includes enough rows and columns to process four macroblocks of data, plus an extra four columns that enable the scan pattern 100 to shift horizontally as well as vertically. For instance, in the case of 16×16 macroblocks, a 23×16 pixel shift register could be used to implement the scan pattern 100 shown in FIG. 5. It should be understood that in other examples a differently sized memory array could be used to process more or less than four macroblocks of data. The size of the shift register should be selected so that it includes a number of extra columns (or rows) that is equal to the number of macroblocks that are to be processed in a typical pass of the scan pattern.

In the illustrated example, the scan pattern 100 starts at the top left corner of the search area, and performs four macroblock comparisons in the horizontal direction before loading an additional stride of data to the bottom of the shift register and shifting to the next row of pixel data. This process is repeated until the bottom of the search area is reached, at which point the scan pattern 100 performs eight comparisons in the horizontal direction. The additional four comparisons provide a horizontal shift at the bottom of the search area, which can be performed without loading additional pixel data because of the extra four columns in the memory array. The scan pattern 100 then loads an additional stride of data to the top of the shift register to shift up one row of pixels, and performs four macroblock comparisons in the horizontal direction. This process is repeated until the top of the search area is reached, at which point the scan pattern 100 again performs eight comparisons in the horizontal direction to effectuate a horizontal shift. As illustrated, the scan pattern 100 repeats this process, scanning up and down the columns of data until the entire search area is processed.

FIGS. 6A-6K provide a more detailed example of how pixel data may be loaded into a 23×16 shift register and processed using the efficient scan pattern 100 of FIG. 5. These figures each show a 48×48 pixel search area 200. Each figure also includes a solid box 210 that represents a 23×16 pixel shift register and a dotted box 220 that represents a 16×16 macroblock of reference pixel data within the shift register that is compared with the current macroblock to calculate a SAD value. The star in the top left corner of each dotted box 220 shows the position of the motion vector that identifies the 16×16 macroblock. Cross-referencing FIG. 5 with FIGS. 6A-6K, each star in FIGS. 6A-6K corresponds with one of the motion vector locations 102-112 in the scan pattern 100 of FIG. 5.

Figure 6A:
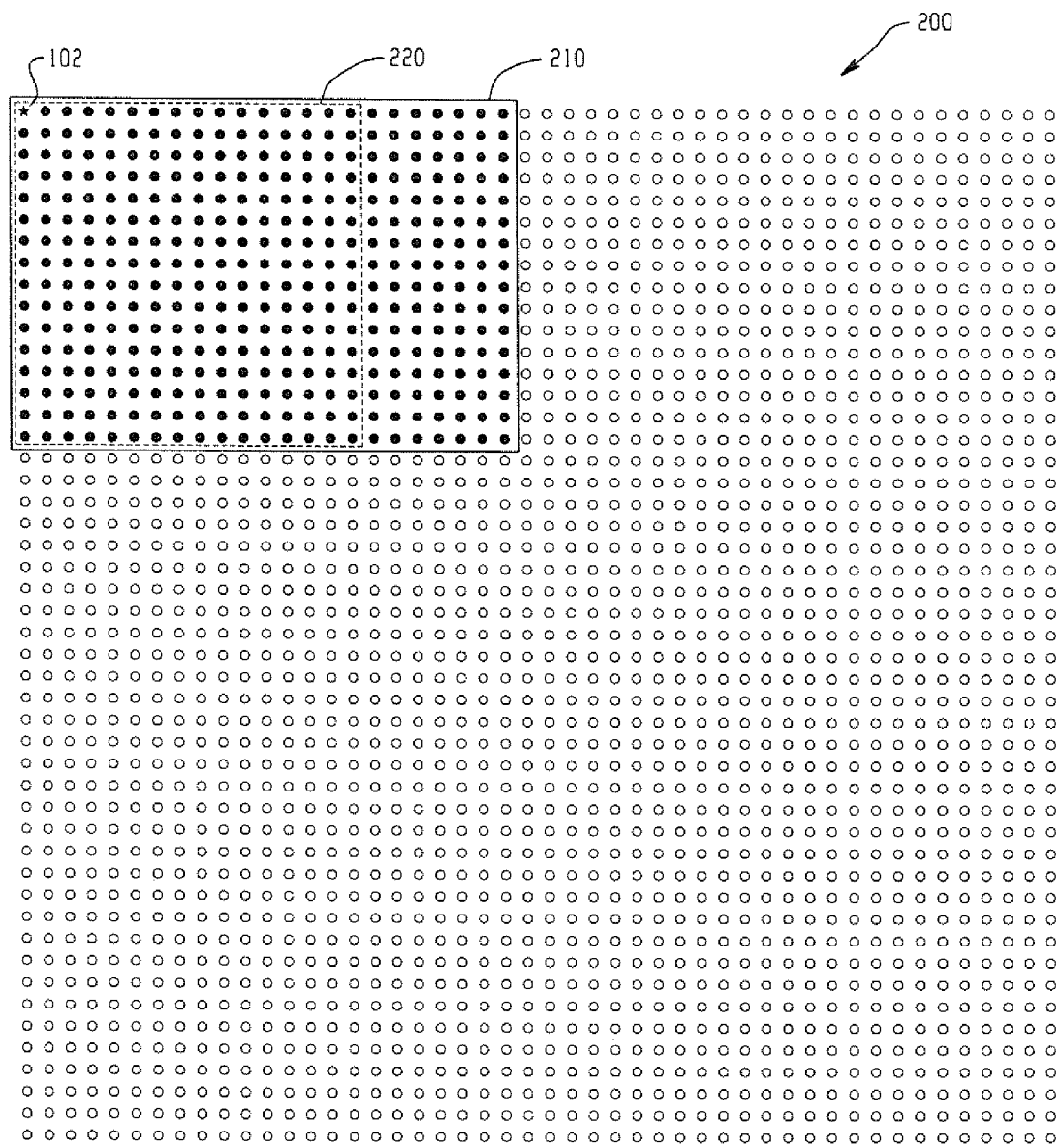
FIGS. 6A-6K illustrate an example of how pixel data may be loaded into a 23×16 shift register and processed using the efficient scan pattern of FIG. 5.
Figure 6B:
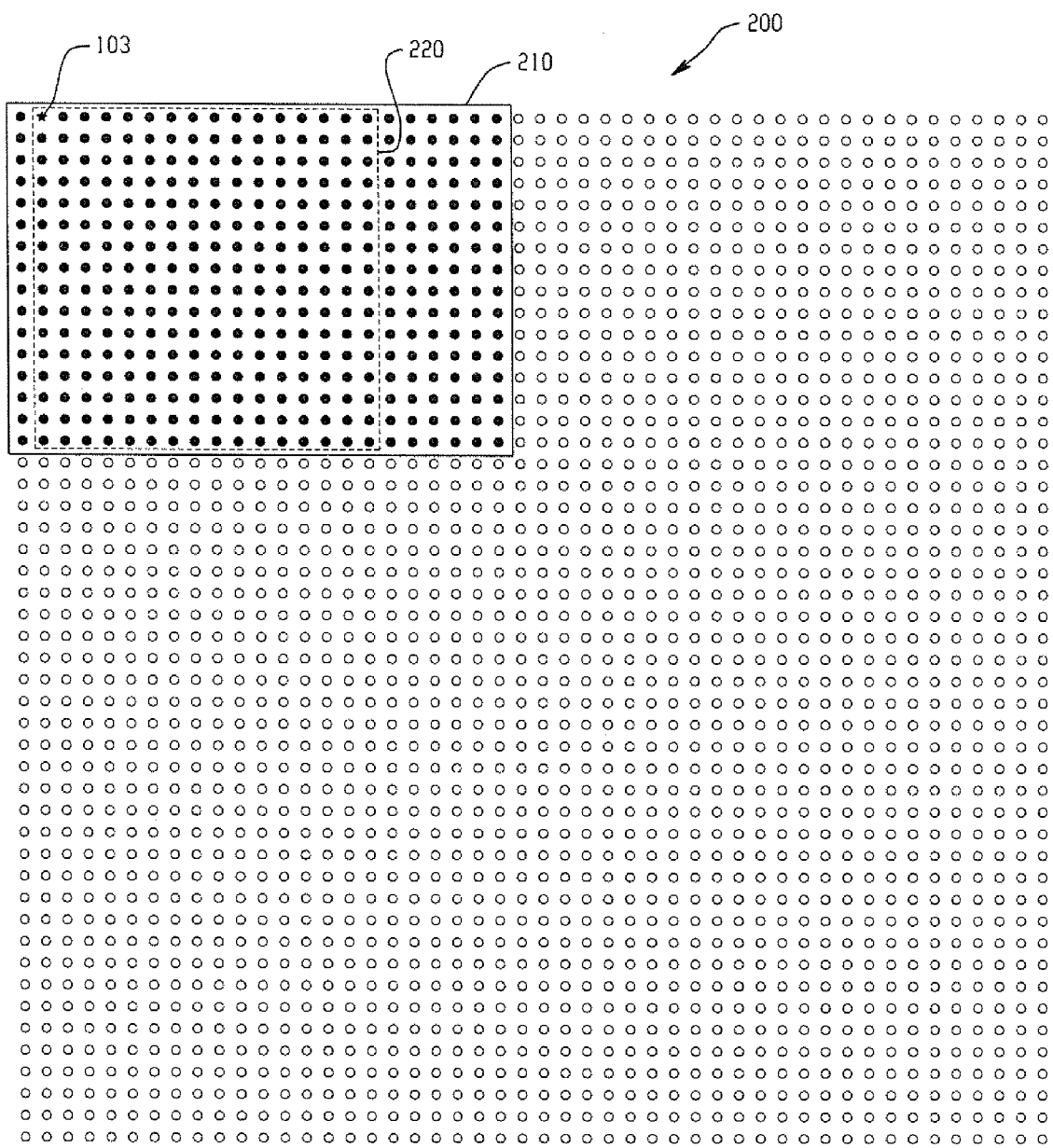
Figure 6C:
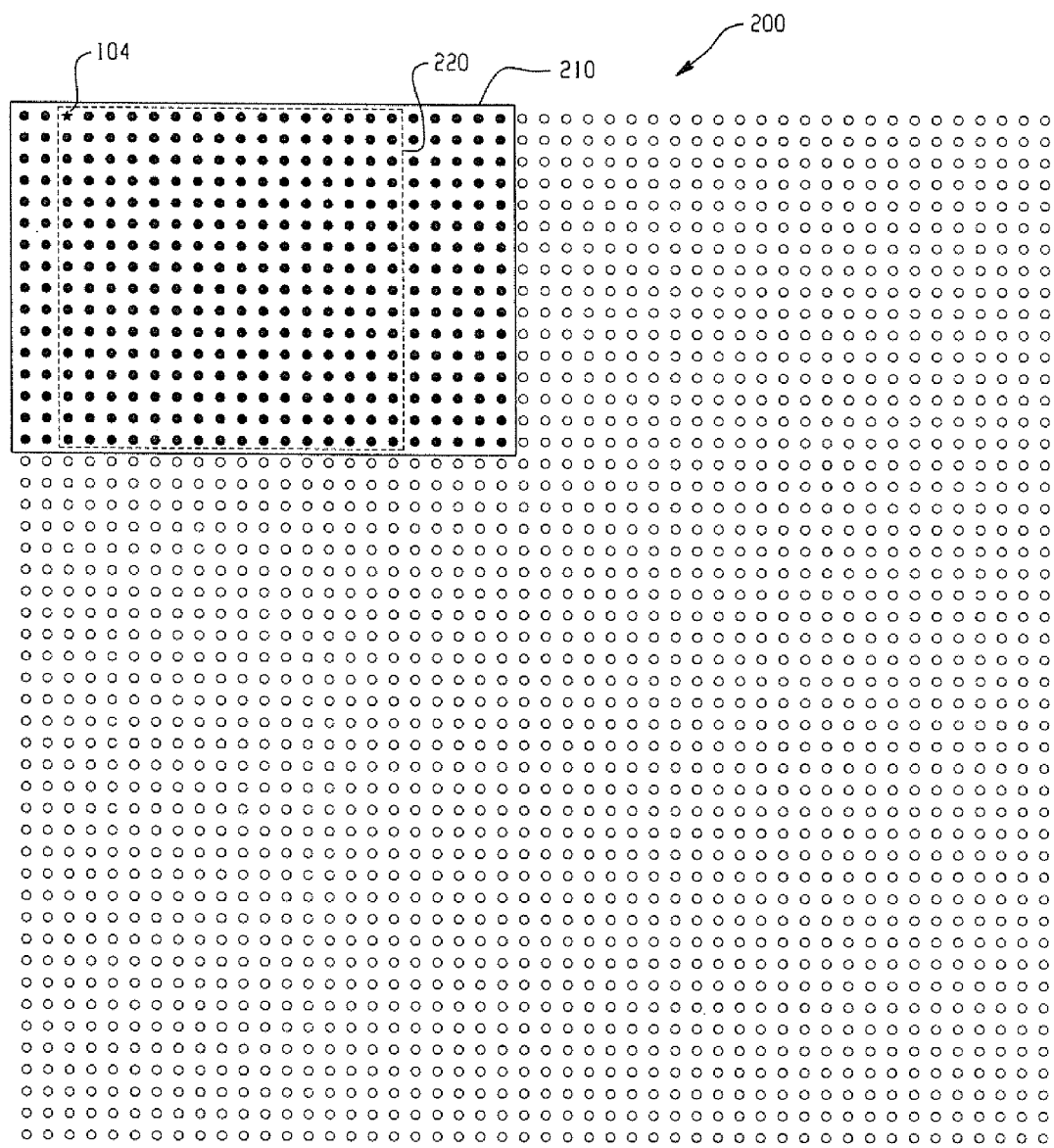
Figure 6D:
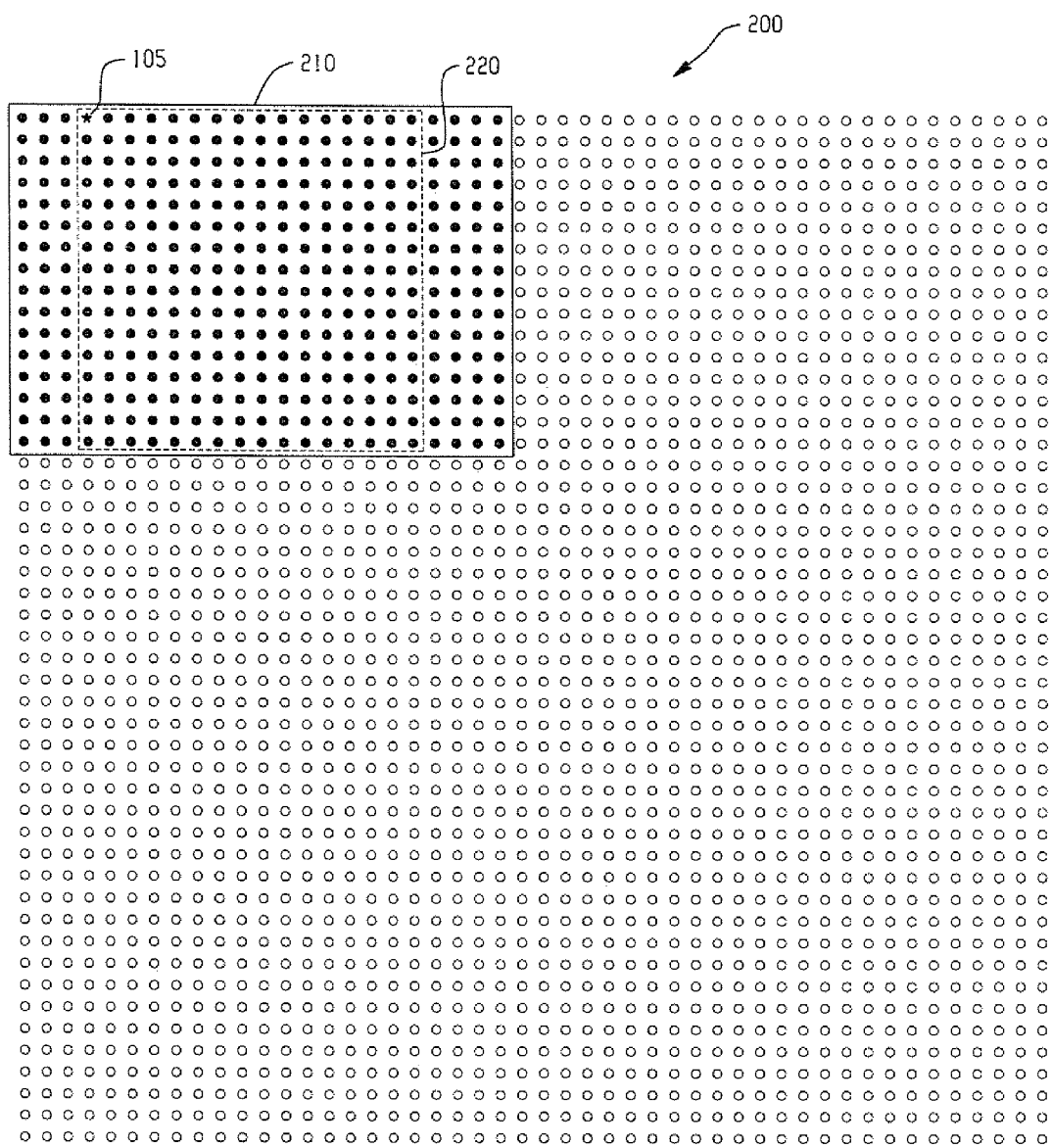
Figure 6E:
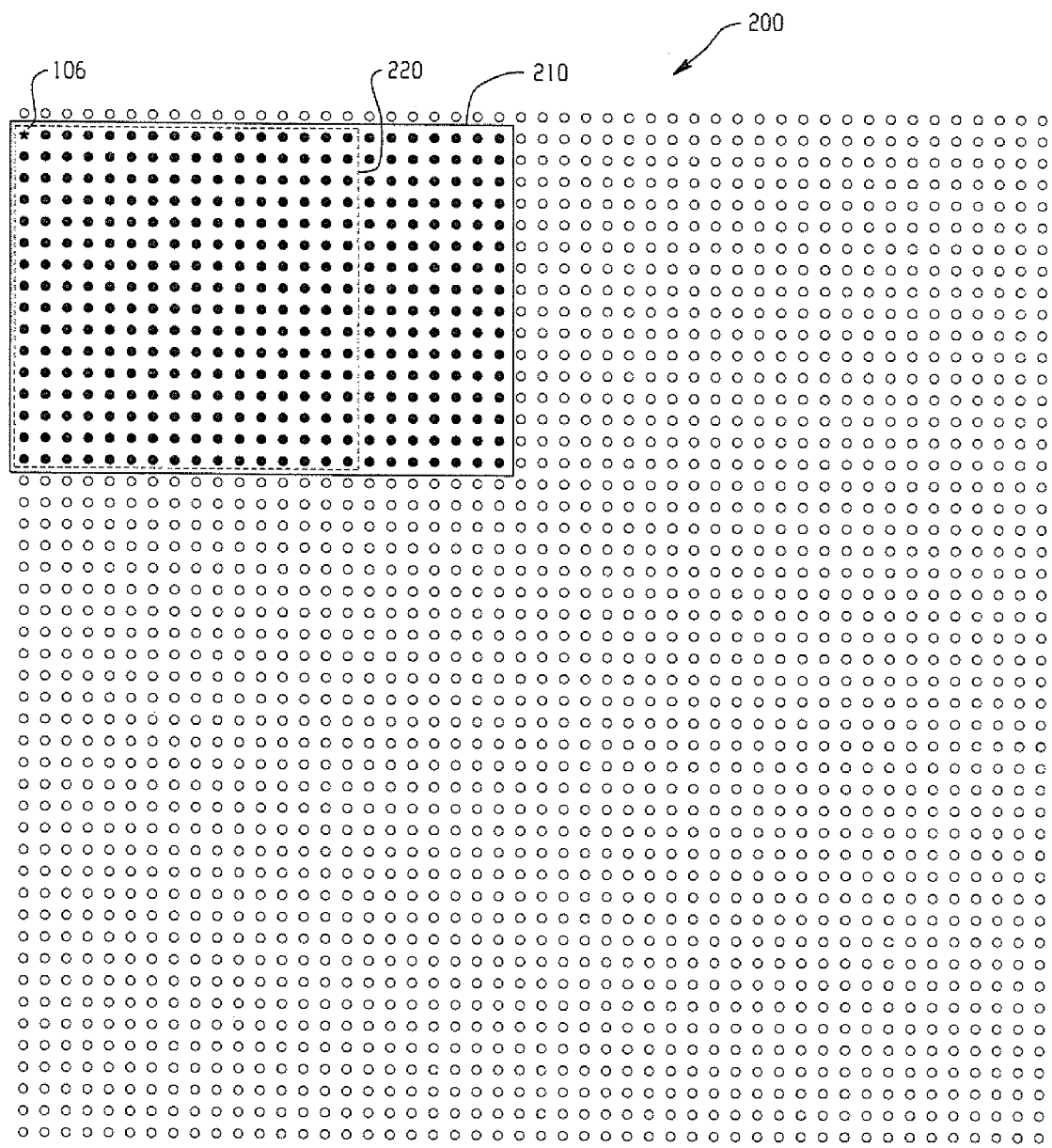

With reference first to FIG. 6A, this figure illustrates the pixel contents of the 23×16 pixel shift register 210 at the first motion vector location 102 shown in FIG. 5. In order to perform the SAD calculation at the first motion vector location 102, the shift register 210 is loaded with pixel data and the first 16×16 macroblock 220 is presented for comparison. As shown in FIGS. 6B-6D, the pixel macroblocks 220 corresponding to the next three motion vectors 103-105 may then each be presented for comparison without loading any additional pixel data into the shift register 210. After the fourth reference macroblock is processed, the scan pattern 100 moves down one row in the search area by shifting the pixel data in the shift register 210 up one row and loading a single stride of 23 pixels into the bottom row of the shift register 210, as illustrated in FIG. 6E. This process is repeated, processing four macroblocks in each row, until the scan pattern 100 reaches the bottom of the search area 200.

Figure 6F:
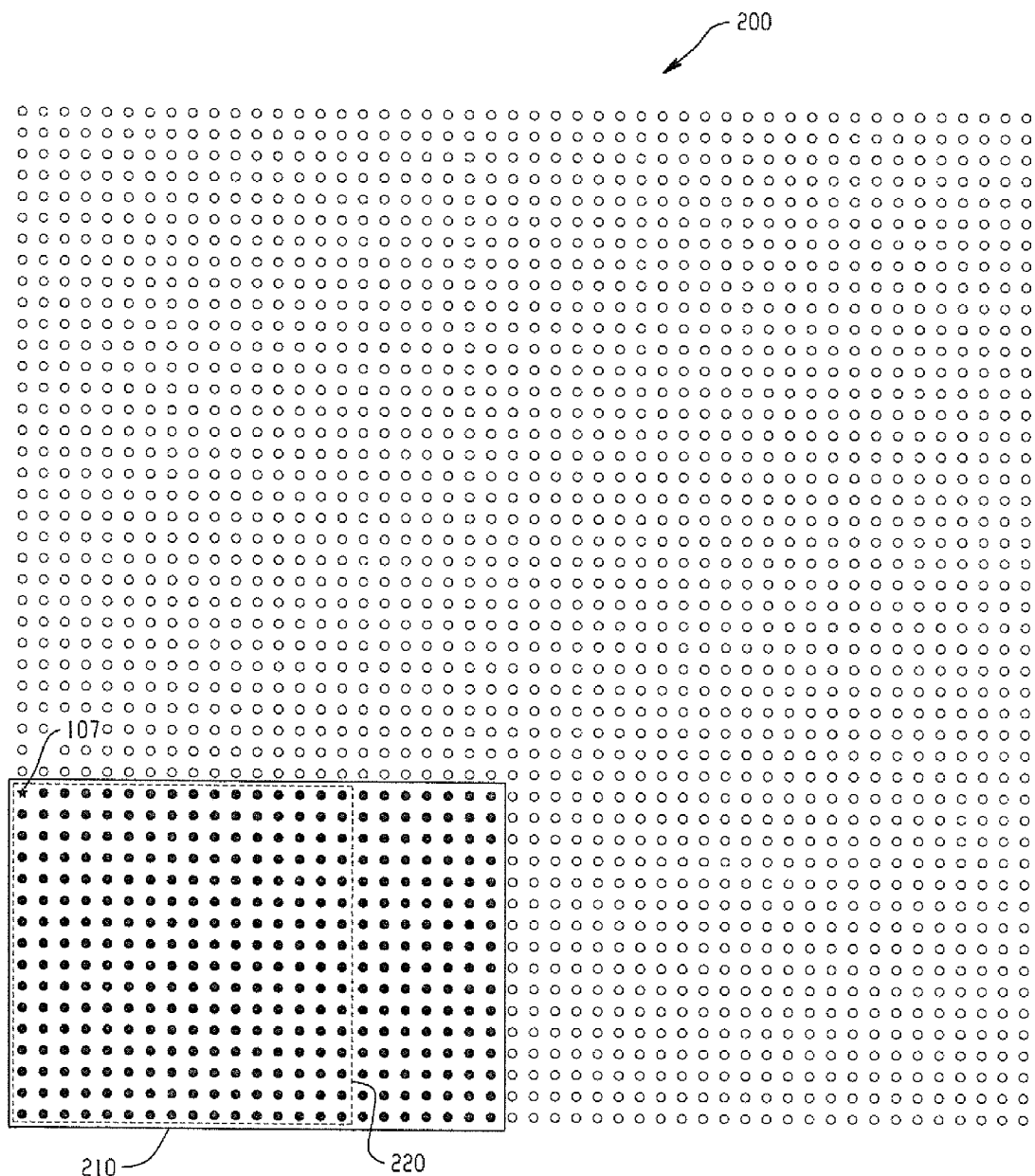
Figure 6G:
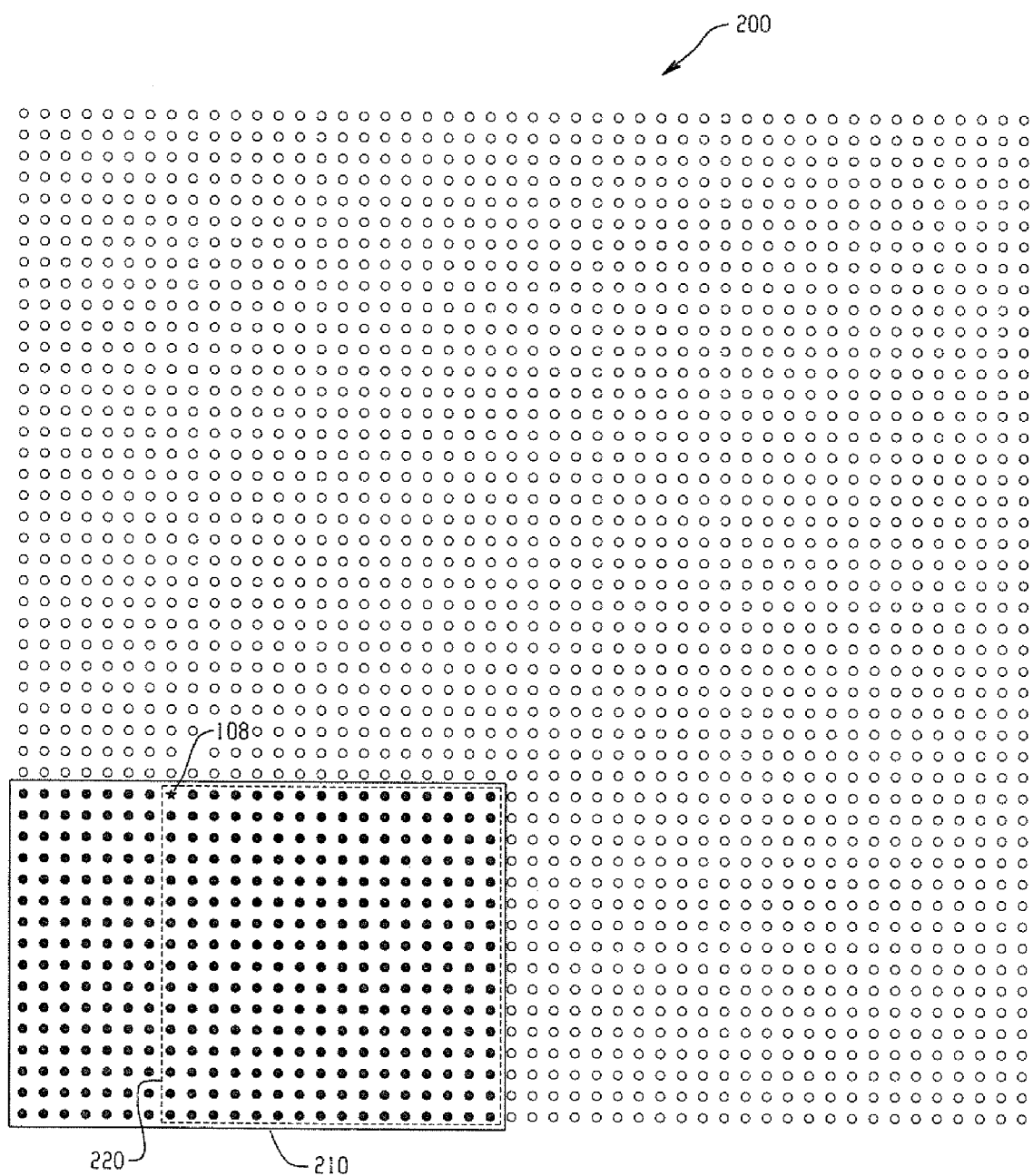

The pixel contents of the shift register 210 when the scan pattern 100 first reaches the bottom of the search area 200 are illustrated in FIG. 6F. At the bottom of the search area 200, the scan pattern 100 performs eight SAD comparisons, starting at motion vector location 107 shown in FIG. 6F and ending at motion vector location 108 shown in FIG. 6G. The extra four SAD calculations performed at the bottom of the search area 200 set up the scan pattern 100 to perform the vertical and horizontal shifts shown in FIG. 6H.

Figure 6H:
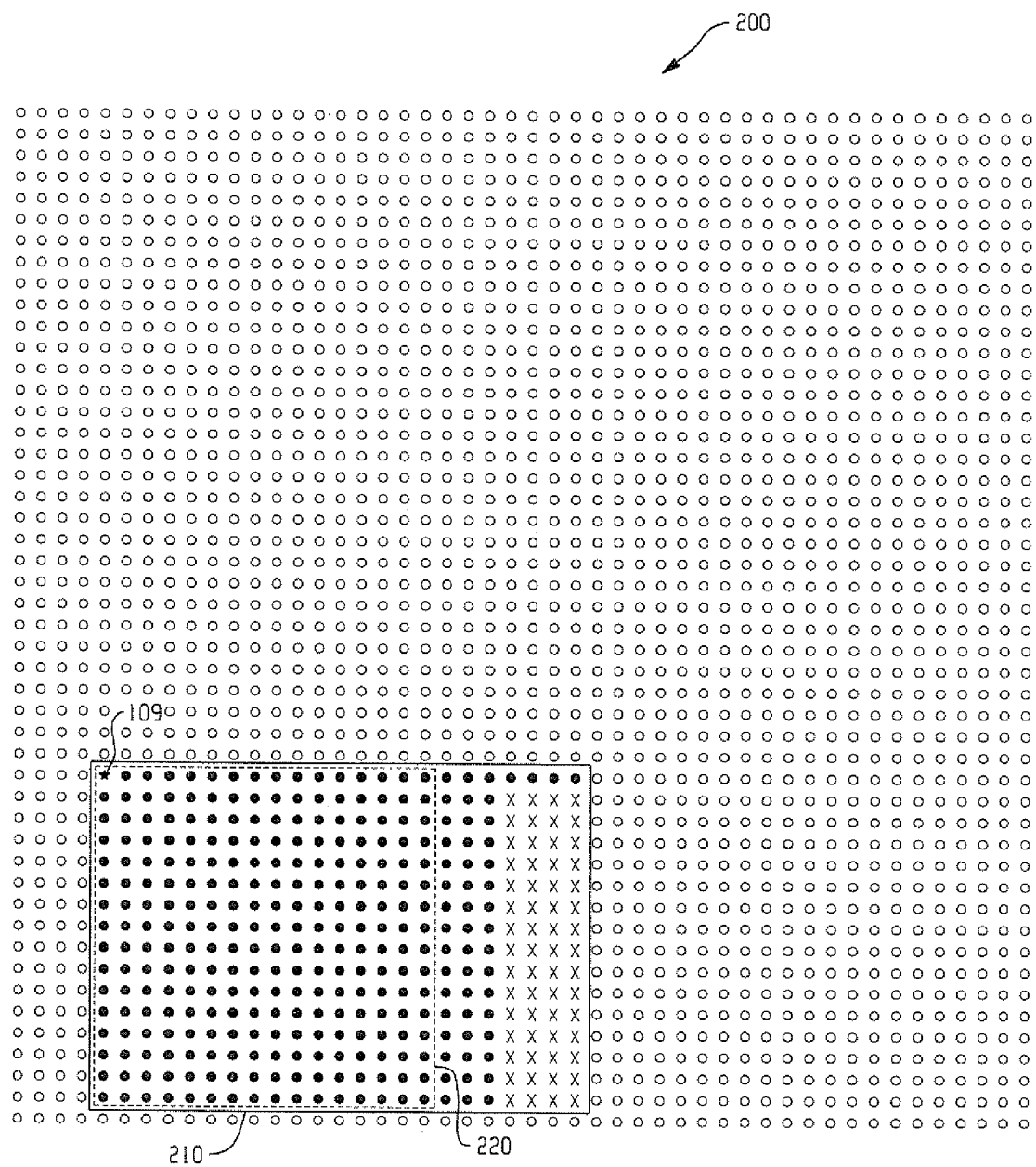
Figure 6I:
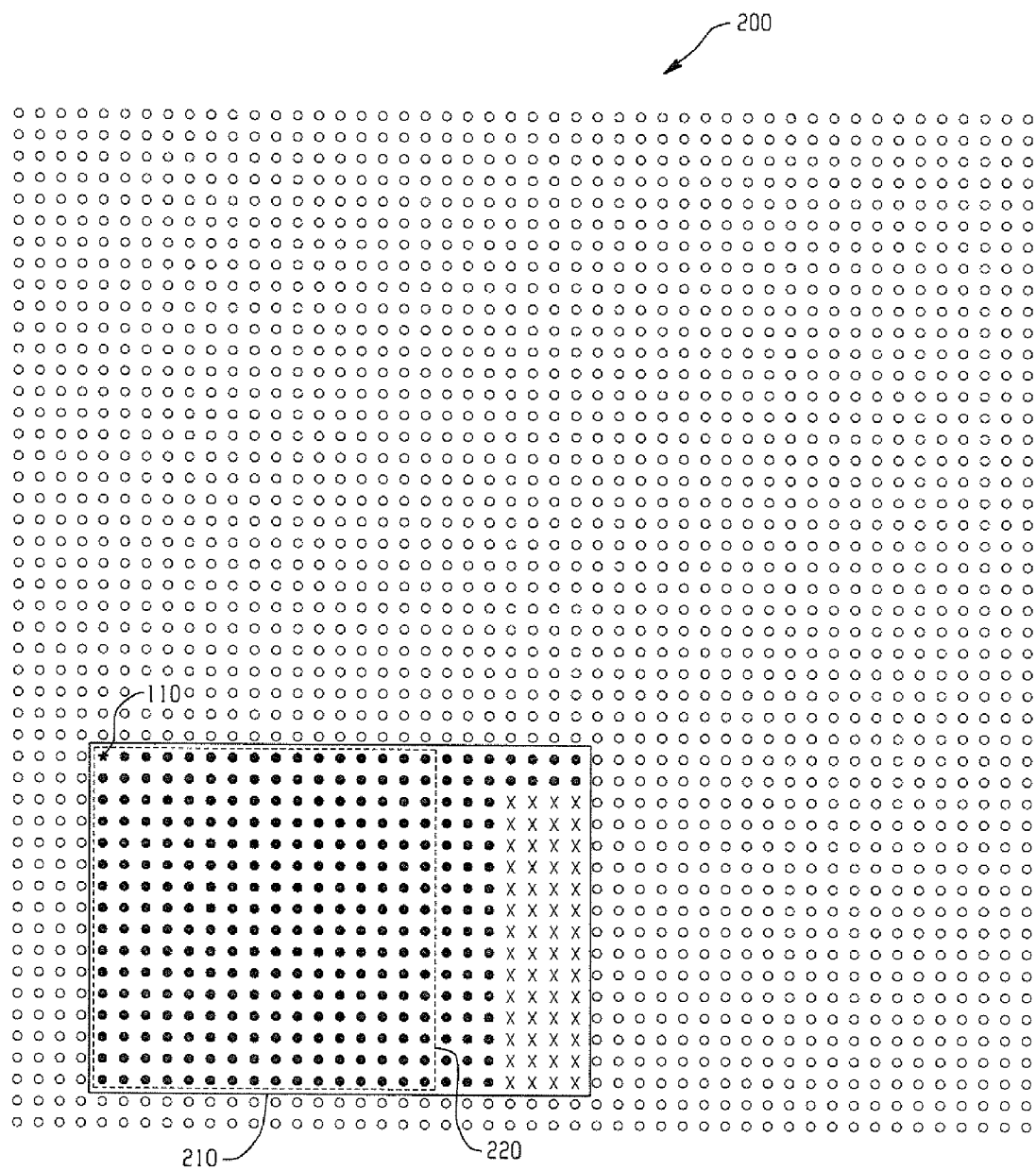
Figure 6J:
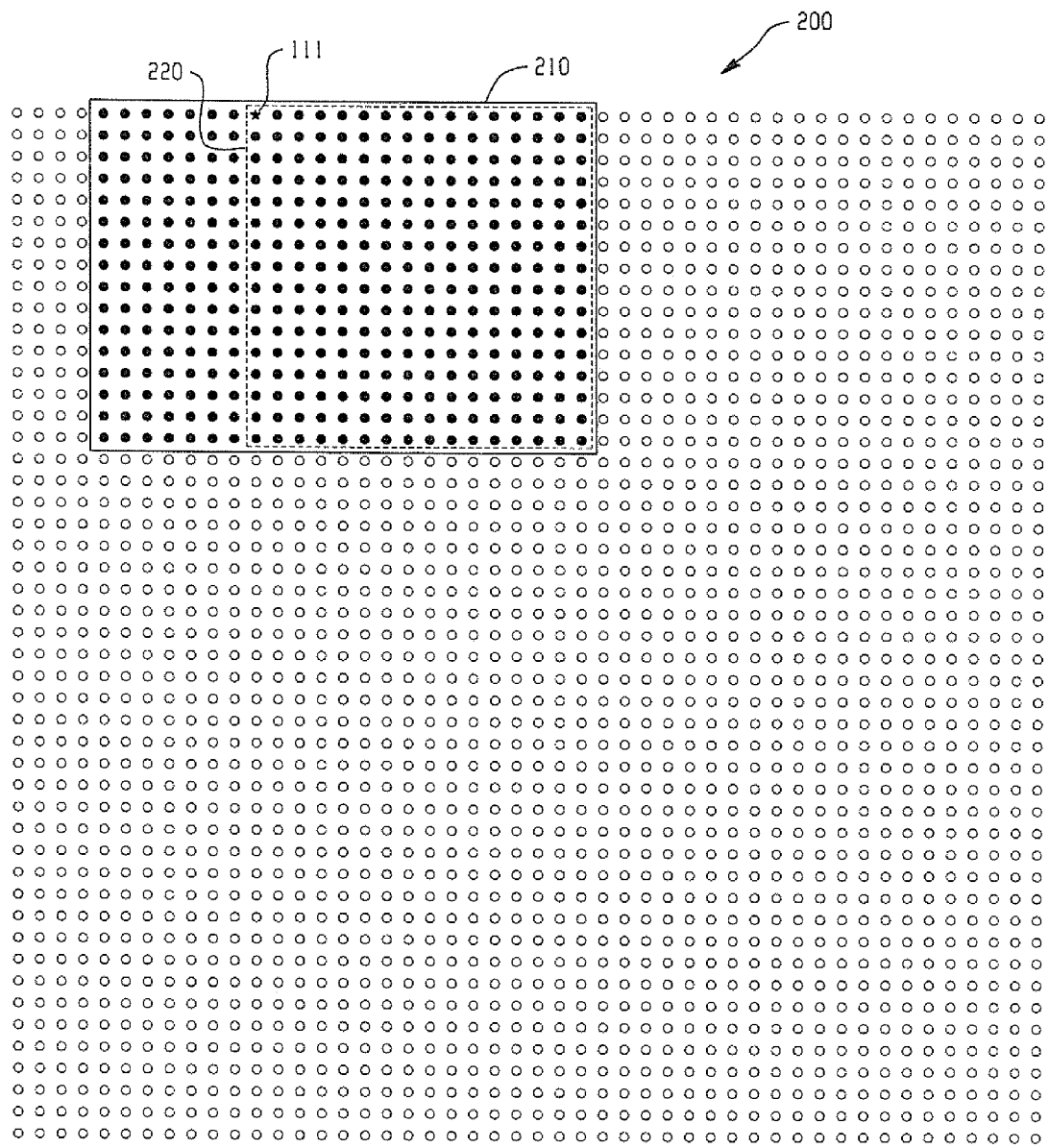
Figure 6K:
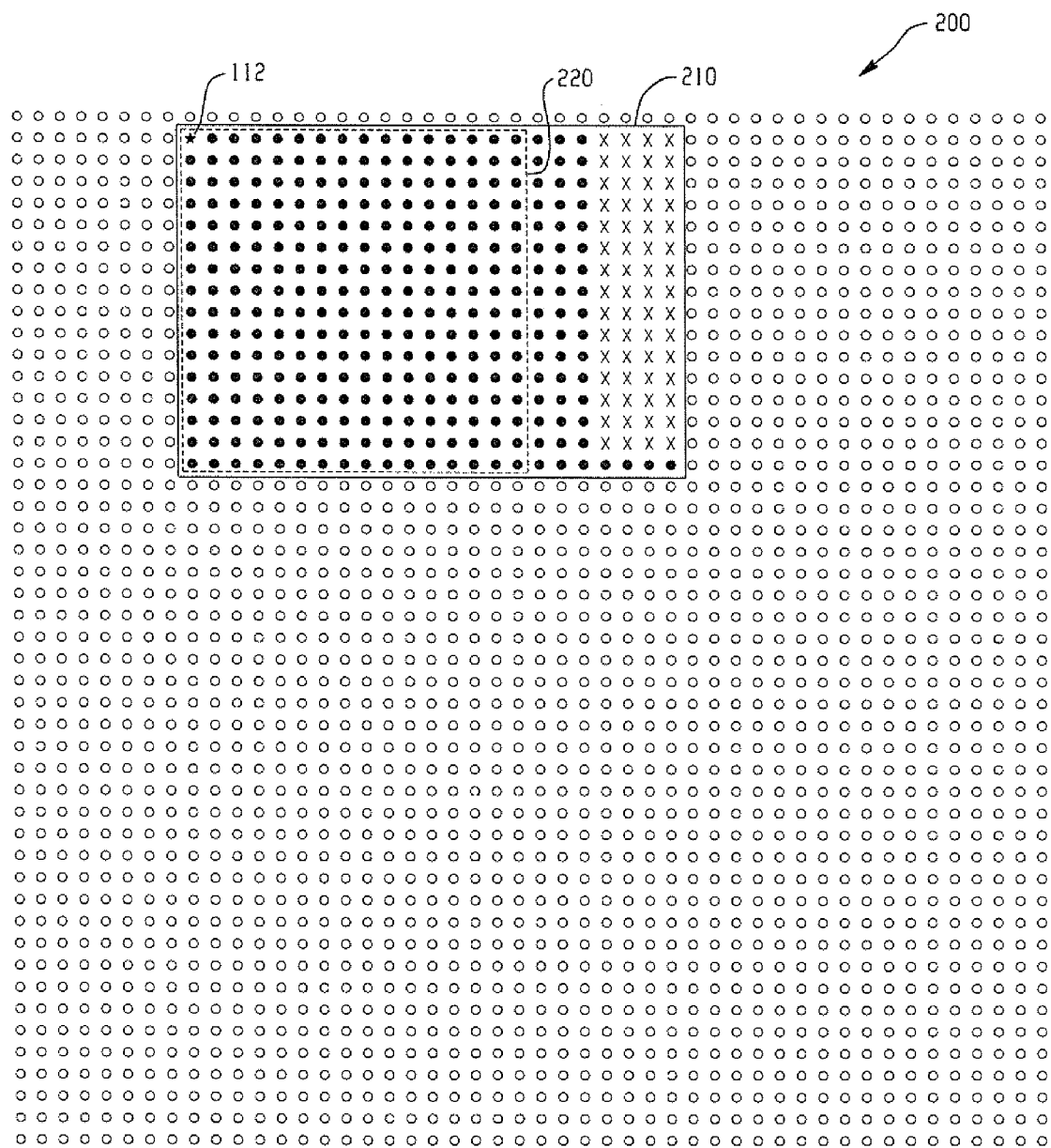

In FIG. 6H, the pixel data in the shift register 210 is shifted four columns to the left and down one row and a single stride of pixel data is added to the top row of the shift register 210. As illustrated, the extra four columns of pixel data in the shift register 210 enable a shift in both the horizontal and vertical directions by loading only a single row of 23 pixels. The "X's" shown in FIG. 6H are "don't care" pixel values, which are not needed for the SAD calculations at this stage in the scan pattern 100. As shown in FIGS. 6H and 6I, the extra four columns in the shift register 210 are reloaded one row at a time (filling in the don't care positions in the shift register) as the scan pattern 100 progresses back up the search area 200, performing four SAD calculations for each new stride of data that is loaded into the shift register 210. Similarly, FIGS. 6J and 6K illustrate how another shift is performed when the scan pattern 100 reaches the top of the search area 200. In this manner, after the shift register 210 is initially loaded, the scan pattern 100 may perform SAD calculations for every motion vector in the search area, while never needing to load more than a single stride of 23 pixels at a time.

Figure 7:
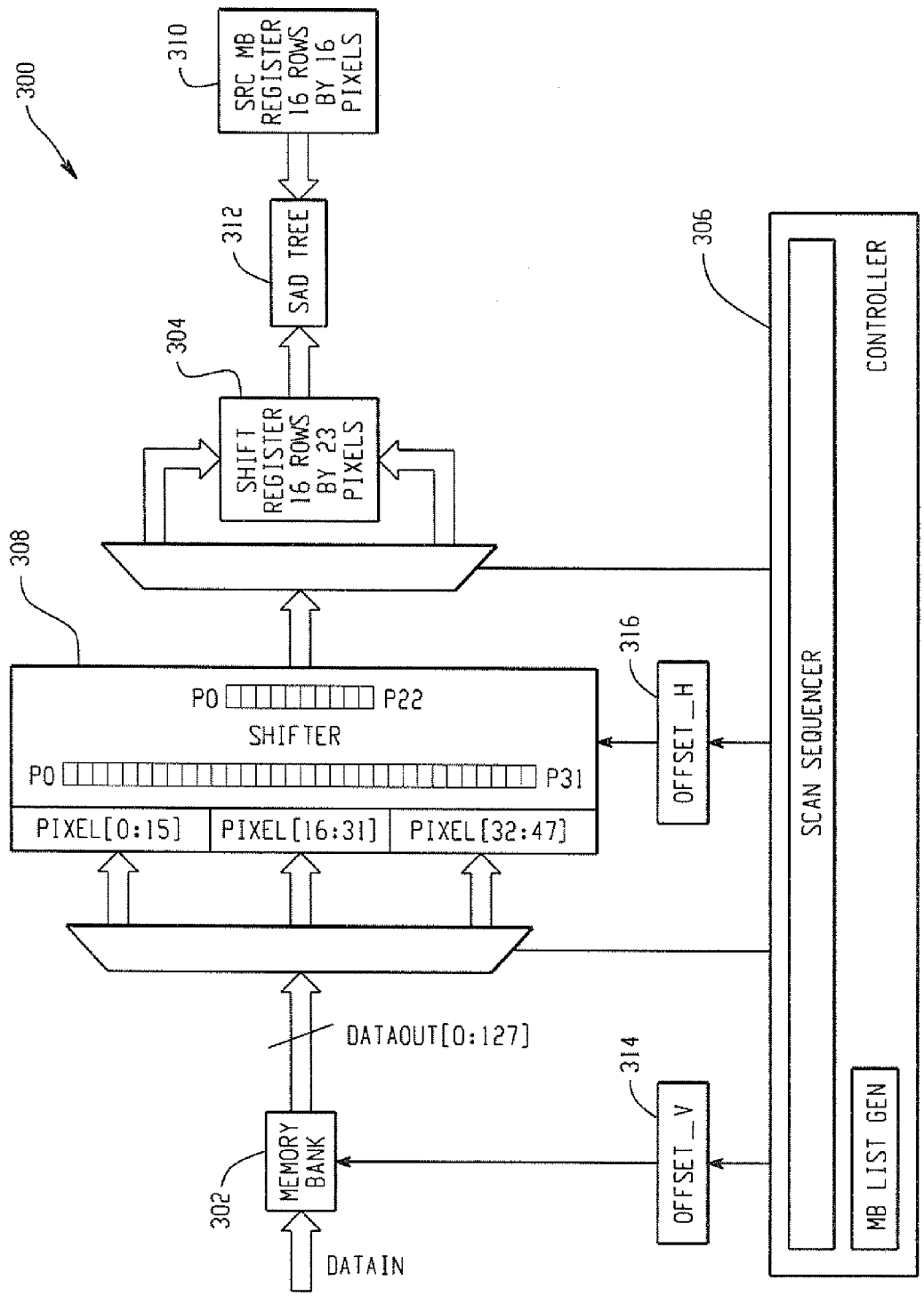
FIG. 7 is a block diagram depicting an example motion estimation engine that may utilize the efficient scan pattern shown in FIG. 5.

FIG. 7 is a block diagram depicting an example motion estimation engine 300 that may utilize the efficient scan pattern shown in FIG. 5. The motion estimation engine 300 includes a memory bank 302 that stores the pixel data for the reference frame, a 23×16 pixel shift register 304, and a scan sequencer 306 and shifter 308 for loading data from the memory bank 302 into the shift register 304. The motion estimation engine 300 also includes a register 310 for storing the current 16×16 macroblock of pixel data and a processing block (e.g., SAD tree) 312 for performing the SAD calculations.

In operation, the scan sequencer 306 generates the address signals 314, 316 to load pixel data into the 16×23 shift register 304 for processing according to the scan pattern. In this example, the pixel data is loaded in strides of 23 pixels. To identify a 23 pixel stride from the memory bank 302, the scan sequencer generates a first address signal (Offset_V) 314 that identifies blocks of memory that include the 23 pixel stride. In the illustrated example, the pixel data is stored within the memory bank 302 in 16 pixel blocks, and therefore the 23 pixel stride may span either two or three memory blocks. The identified blocks of data from the memory bank 302 are loaded into the shifter 308, which is used to extract the 23 pixels stride. The location of the 23 pixel stride within the memory blocks is identified by a second address signal (Offset H) generated by the scan sequencer 306. The address signals 314, 316 may, for example, be generated by the scan sequencer using a look-up table (MB List Gen) that relates motion vector locations with the memory locations for the corresponding 16×16 macroblocks.

Once the appropriate pixel data is loaded into the 23×16 shift register 304 according to the scan pattern, the shift register 304 multiplexes out one 16×16 macroblock of reference data at a time to the SAD tree 312. The SAD tree 312 compares the macroblocks of reference data with the current macroblock 310 to calculate a SAD corresponding to each motion vector location in the search area, and selects the reference motion vector location with the lowest SAD as the best pixel fit with the current motion vector.

It should be understood that the system blocks shown in FIG. 7, as well as the system blocks set forth in the other system diagrams described herein, may be implemented using software, hardware or a combination of software and hardware components. In addition, hardware components for one or more of the system blocks may be implemented in a single integrated circuit or using multiple circuit components.

Figure 8:
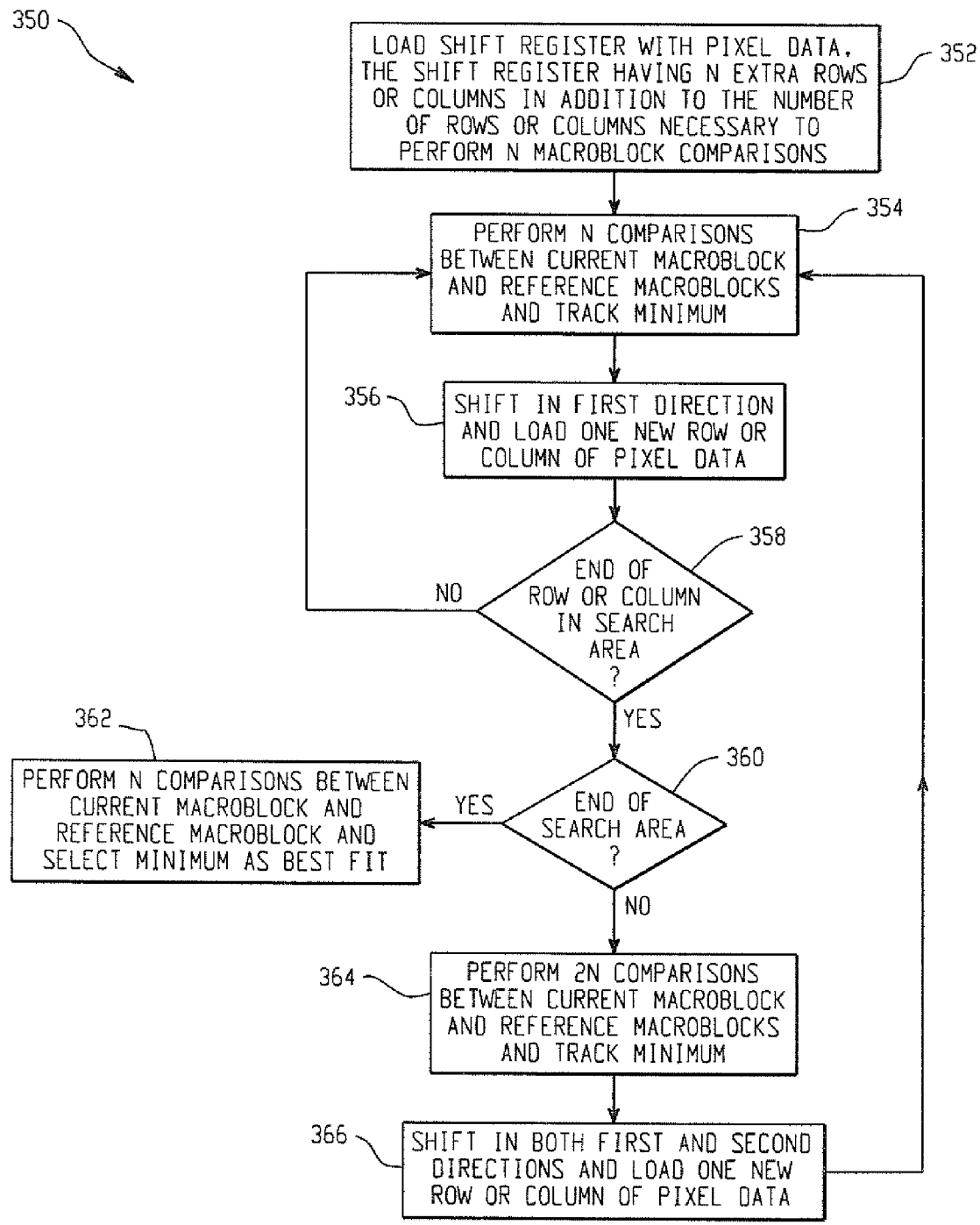
FIG. 8 is a flow diagram illustrating an example method of scanning a search area of reference pixel data to identify a motion vector location for encoding a current macroblock of pixel data.

FIG. 8 is a flow diagram illustrating an example method 350 of scanning a search area of reference pixel data to identify a motion vector location for encoding a current macroblock of pixel data. At step 352, a shift register is loaded with reference pixel data from a local cache. The shift register is loaded with sufficient reference pixel data to perform a pre-selected number (N) of comparisons between macroblocks of reference pixel data and a macroblock of pixel data in a current frame. In addition, the shift register includes N extra columns or rows that are also loaded with reference pixel data to enable shifting in two directions.

In step 354, the pre-selected number (N) of comparisons between the current macroblock and reference macroblocks are performed using the reference pixel data loaded in the shift register. In addition, the reference macroblock with the minimum number of differences from the current macroblock is tracked to identify the best fit pixel match between the current macroblock and each of the reference macroblocks in the search area. The comparison may, for example, include a sum of absolute differences (SAD) calculation, and the reference macroblock with the lowest SAD may be tracked to identify the best fit pixel match with the current macroblock. At step 356, the pixel data in the shift register is shifted in a first direction (e.g., vertically or horizontally) and a new stride (e.g., one row or column) of pixel data is loaded into the register.

At step 358, the method determines if the search has reached the end of a row (or column) in the search area. If not, then the method returns to step 354 to perform another comparison. If the search has reached the end of a row (or column) in the search area, however, then the method proceeds to step 360. At step 360, the method determines if the entire search area has been searched. If so, then at step 362, N additional comparisons are performed between the reference macroblocks of pixel data loaded in the shift register and the current macroblock, and the reference macroblock with the lowest comparison value (e.g., lowest SAD) in the search area is selected as the best fit pixel match with the current macroblock. Otherwise, if the search is not complete, then the method proceeds to step 364.

In step 364, the method performs twice the pre-selected number (N) of comparisons between the current macroblock and the reference macroblocks using the pixel data loaded in the shift register. It is possible to perform 2N comparisons because of the extra N rows (or columns) of pixel data that are loaded in the shift register. The extra N comparisons performed in step 364 sets up the method for shifting the pixel data in the register in both a first and a second direction (e.g., both vertically and horizontally) at step 366. The method then returns to step 354.

This written description uses examples to disclose the invention, including the best mode, and also to enable a person skilled in the art to make and use the invention. The patentable scope of the invention may include other examples that occur to those skilled in the art.

It is claimed:

1. A method of scanning a search area of reference pixel data to identify a reference macroblock of pixels with a closest pixel fit to a current macroblock of pixels, comprising:

a) loading a local memory array with reference pixel data from the search area, the local memory array including N extra rows or columns in addition to a number of rows or columns used to store N reference macroblocks of pixels;

b) using the reference pixel data loaded in the local memory array to compare N reference macroblocks of pixels with the current macroblock of pixels to track a reference macroblock of pixels that most closely matches the current macroblock of pixels;

c) shifting the reference pixel data in the local memory array in a first direction and loading one new row or column of reference pixel data into the local memory array;

d) if an end of a row or column in the search area has not been reached, then returning to step b;

e) if an end of a row or column in the search area has been reached, then using the reference pixel data loaded in the local memory array to compare 2N reference macroblocks of pixels with the current macroblock of pixels to track the reference macroblock of pixels that most closely matches the current macroblock of pixels; and shifting the reference pixel data in the local memory array in both the first direction and a second direction, loading one new row or column of reference pixel data into the local memory array, and returning to step b.

2. The method of claim 1, further comprising:

prior to step e, if an end of a row or column in the search area has been reached and all rows and columns in the search area have been searched, then using the reference pixel data loaded in the local memory array to compare N reference macroblocks of pixels with the current macroblock of pixels to track a reference macroblock of pixels that most closely matches the current macroblock of pixels, and selecting the reference macroblock of pixels that most closely matches the current macroblock of pixels as the closest pixel fit in the search area.

3. The method of claim 1, wherein the local memory array is a shift register.

4. The method of claim 3, wherein the reference macroblocks of pixels and the current macroblocks of pixels are 16×16 macroblocks and the shift register includes 23 columns and 16 rows.

5. The method of claim 1, wherein comparisons between reference macroblocks and the current macroblock of pixels are performed by calculating a sum of absolute differences.

6. The method of claim 5, where a reference macroblock of pixels having the lowest sum of absolute differences out of all of the reference macroblocks of pixels in the search area is selected as the reference macroblock of pixels with the closest pixel fit to the current macroblock of pixels.

7. The method of claim 1, wherein N is four.

8. The method of claim 1 wherein, in step f, the shifting in the first direction occurs after the shifting in the second direction.

9. A system for scanning a search area of reference pixel data to identify a reference macroblock of pixels with a closest pixel fit to a current macroblock of pixels, comprising:

a local memory array having a plurality of rows and columns, the local memory array including N extra rows or columns in addition to a number of rows or columns necessary to store N reference macroblocks of pixels;

a processing block configured to compare reference macroblocks of pixels with the current macroblock of pixels to identify the reference macroblock of pixels with the closest pixel fit to the current macroblock of pixels; and a scan sequencer configured to load reference pixel data into the local memory array and present reference macroblocks of pixels from the local memory array to the processing block according to a scan pattern, the scan pattern causing either N or 2N reference macroblocks of pixels to be presented to the processing block before new reference pixel data is loaded into the local memory array, the scan pattern further causing reference pixel data in the local memory array to shift in either a first direction or both a first and a second direction when loading new reference pixel data such that no more than a single row or column of reference pixel data is loaded into the local memory array between any two comparisons by the processing block.

10. The system of claim 9, wherein the local memory array is a shift register.

11. The system of claim 10, wherein the shift register includes 16 rows and 23 columns, and wherein the reference macroblocks of pixels and the current macroblock of pixels are 16×16 macroblocks.

12. The system of claim 9, wherein N is four.

13. The system of claim 9, wherein the processing block is configured to compare reference macroblocks of pixels with the current macroblock of pixels by calculating a sum of absolute differences.

14. The system of claim 13, wherein the processing block is further configured to select, as the reference macroblock of pixels with the closest pixel fit to the current macroblock of pixels, a reference macroblock of pixels having the lowest sum of absolute differences out of all of the reference macroblocks of pixels in the search area.

15. The system of claim 9, furl her comprising:

a shifter that is controlled by the scan sequencer to retrieve blocks of reference pixel data from a local memory cache, extract rows of reference pixel data from the blocks of reference pixel data, and load the local memory array with the rows of reference pixel data.

16. A method of scanning a search area of reference pixel data to identify a reference macroblock of pixels with a closest pixel fit to a current macroblock of pixels, comprising:

loading a local memory array with reference pixel data from the search area to compare a first plurality of reference macroblocks of pixels with the current macroblock of pixels;

shifting the reference pixel data in the local memory array in a first direction and loading one row or column of pixel data from the search area into the local memory array to compare a second plurality of reference macroblocks of pixels with the current macroblock of pixels; and shifting the reference pixel data in the local memory array in both the first direction and a second direction and loading one row or column of pixel data from the search area into the local memory array to compare a third plurality of reference macroblocks of pixels with the current macroblock of pixels.

17. The method of claim 16, wherein after the local memory array is loaded with reference pixel data to compare the first plurality of reference macroblocks of pixels with the current macroblocks of pixels, a remainder of the reference macroblocks of pixels in the search area are compared with the current macroblock of pixels without loading more than a single row or column of reference pixel data into the local memory array between any two comparisons.

18. The method of claim 17, wherein the shifting of the reference pixel data in the local memory array in both the first and second directions is enabled by utilizing a local memory array that includes a plurality of extra rows or columns in addition to those used to compare the first plurality of reference macroblocks of pixels with the current macroblock of pixels.

19. The method of claim 16, further comprising:

before shifting the reference pixel data in the local memory array in both the first direction and the second direction, comparing a fourth plurality of reference macroblocks of pixels with the current macroblock of pixels, wherein the fourth plurality of reference macroblocks of pixels includes twice as many macroblocks as the first, second and third pluralities of reference macroblocks of pixels.

20. The method of claim 16 wherein the shifting in both the first direction and the second direction comprises shifting in the first direction after shifting in the second direction.

21. A method for determining a motion vector location for encoding a video signal, comprising:
- storing a reference frame of the video signal in a memory device;
- receiving a current frame of the video signal to be encoded;
- selecting a macroblock of pixels from the current frame;
- identifying a search area in the stored reference frame for comparison with the macroblock of pixels from the current frame;
- for each pixel in the search area, comparing the macroblock of pixels from the current frame with a reference macroblock of pixels from the stored reference frame to determine a sum of absolute differences, the comparison being performed us mg a scan pattern for loading the reference macroblock of pixels for each pixel in the search area into a local memory array,
- the scan pattern causing sufficient pixel data to be loaded into the local memory array to determine the sums of absolute differences for multiple reference macroblocks of pixels without loading any additional pixel data, and the local memory array being sized to allow the scan pattern to shift pixel data within the local memory array in two directions such that the sums of absolute differences for each reference macroblock within the search area are determined without loading more than a single row or column of pixel data into the local memory array between any two sum of absolute differences calculations; and
- selecting a pixel in the search area that is associated with the lowest sum of absolute differences as a motion vector location associated with the macroblock of pixels from the current frame.

22. The method of claim 21, wherein the local memory array is a shift register.

23. The method of claim 22, wherein the shift register includes 16 rows and 23 columns, and wherein the macroblock of pixels from the current frame and the reference macroblock of pixels are 16×16 macroblock.

24. The method of claim 21, wherein the size of the search area is variable.

* * * * *